United States Patent [19]

Metzler, Jr.

[11] 4,431,863

[45] Feb. 14, 1984

[54] PROTECTIVE BOOT FOR CABLES AND METHOD OF APPLYING SAME

[75] Inventor: Allan R. Metzler, Jr., Orange, Ohio

[73] Assignee: Preformed Line Products Company, Mayfield Village, Ohio

[21] Appl. No.: 309,563

[22] Filed: Oct. 8, 1981

[51] Int. Cl.³ .......................... H02G 1/00; H01B 7/24
[52] U.S. Cl. ..................................... 174/136; 156/54; 428/80; 428/192; 428/542.8
[58] Field of Search ............ 174/79, 135, 136, 138 F, 174/DIG. 12; 29/868; 57/906; 156/49, 53, 54, 56; 285/293; 336/209; 428/80, 192, 542.6, 542.8; 229/87 R, 87 H, 92, 93

[56] References Cited

U.S. PATENT DOCUMENTS

| | | | |
|---|---|---|---|
| 345,219 | 7/1886 | Dodge . | |
| 889,347 | 6/1908 | Vecchio | 229/92 |
| 1,483,196 | 2/1924 | Prince | 229/87 R |
| 2,159,269 | 5/1939 | Hasse | 174/135 |
| 2,558,553 | 6/1951 | Hansen et al. . | |
| 2,660,299 | 11/1953 | Van Wirt | 229/87 R X |

*Primary Examiner*—Laramie E. Askin
*Attorney, Agent, or Firm*—Fay & Sharpe

[57] ABSTRACT

A boot forming member for externally and internally covering end portions of rods surrounding a cable. The boot forming member includes a flat sheet of elastomeric material wrappable around the cable when the rod end portions are spaced outwardly from the cable to provide an inner sleeve portion surrounding the cable beneath the rod end portions and an outer sleeve portion surrounding the cable axially beyond the rod end portions. After the rod end portions are moved inwardly in close surrounding relationship to the inner sleeve portion, the outer sleeve portion is pulled inside out in external covering relationship to the rod end portions.

21 Claims, 9 Drawing Figures

PROTECTIVE BOOT FOR CABLES AND METHOD OF APPLYING SAME

BACKGROUND OF THE INVENTION

This invention relates to the art of arrangements, devices and methods for protecting flexible cable against damage.

The invention is particularly applicable to a protective boot and method for protecting flexible cable against damage from end portions of relatively rigid helical rods surrounding a portion of the cable. It will be appreciated, however, that the invention has broader applications and uses.

Flexible electrical cable or the like is provided with an outer protective sheath of dielectric material such as flexible plastic or rubber. When making connections, such as splices and end terminations, for these cables, it is common to apply helically coiled, substantially rigid metal rods around a length of the cable for distributing pulling forces over a substantial length of the cable disposed on each side of the splice or adjacent the joint. In arrangements of this type, bending and swaying of the cable, along with winding same on or off of storage drums, and vibrations during use, may cause the relatively sharp end portions of the rods to pierce the protective sheath and damage the cable. This is particularly true in the case of splices where the cable and the rods may be trained around sheaves and other cable handling gear during longitudinal movement of the cable. In such arrangements, the end portions of the rods not only cause damage to the cable, but they also have a tendency to catch on the sheaves or other cable handling equipment.

In arrangements of the type described, it is known to protect the cable by wrapping cloth tape or the like around the cable in the area where the rod end portions will be located. It is also known to wrap the end portions of the rods externally with cloth tape or the like to maintain them in close proximity to the cable outer surface so the rod end portions will not catch on sheaves or other cable handling equipment.

However, the available tapes do not adhere well to the outer surface of cable or rod end portions which may be coated with oil, dirt or other contaminants. In addition, the tape generally lacks the requisite flexibility to withstand repeated bending of the cable. Further, an extremely large number of tape layers would be required to adequately protect the cable sheath against puncture and to hold the end portions of the rods close against the cable sheath during bending of the cable.

It is also known to use metal shims for attempting to protect the cable and the shims themselves frequently cause cable damage. It is also known to use mechanical clamps which are quite expensive and inflexible. It is further known to encapsulate the rod end portions in urethane plastic or the like, and this is very expensive and time consuming.

It has, therefore, been considered desirable to develop a simplified and inexpensive arrangement for protecting a cable against damage by end portions of helical rods applied thereto. At the same time, such an arrangement would hold the rod end portions against the cable during bending to prevent snagging of the end portions on cable handling gear. The subject invention is deemed to advantageously meet these needs and others while overcoming the foregoing problems with known prior art arrangements.

BRIEF SUMMARY OF THE INVENTION

In accordance with the subject invention, a boot forming member for externally and internally covering end portions of rods surrounding a cable is provided. This boot forming member is comprised of a substantially flat sheet of highly flexible elastomeric material having inner and outer sleeve forming portions therealong. The sheet is wrappable around a cable to form the inner and outer sleeve forming portions into inner and outer sleeves with the inner sleeve being positioned beneath end portions of rods surrounding the cable and the outer sleeve extending axially of the cable beyond the rod end portions. The outer sleeve forming portion includes gripping means on the one end portion thereof opposite from the inner sleeve forming portion to provide for manual gripping of the outer sleeve and accommodate pulling of same inside out back onto the inner sleeve in external covering relationship to the rod end portions.

In a preferred arrangement, the outer sleeve forming portion of the sheet has a width which is greater than the width of the inner sleeve forming portion. This provides a flap along one side of the outer sleeve forming portion for bonding to an opposed surface of the outer sleeve forming portion.

In a preferred arrangement, the gripping means for pulling the outer sleeve inside out is in the form of a plurality of elongated flexible strips or fingers formed by slitting the outer sleeve forming portion. The slits are preferably in the form of generally U-shaped slots which are smoothly curved so there are no sharp corners which might otherwise cause the sheet to tear during pulling due to stress concentrations.

The sheet preferably has a substantially rhomboidal peripheral shape and a length which is substantially greater than its width. In addition, the width of the sheet is at least approximately two times the circumference of the cable on which it will be used.

In applying the boot forming member to a cable, the end portions of the helical rods are first moved outwardly away from the cable to provide space for wrapping the sheet around the cable with the inner sleeve forming portion positioned beneath the rod end portions. After wrapping of the sheet around the cable, the inner sleeve portion is tightly wrapped with tape beneath the rod end portions which are thereafter moved inwardly into close surrounding relationship to the inner sleeve portion. The free side edge portion of the outer sleeve portion is then bonded to an opposed surface of the outer sleeve portion. Grease is applied to the external surface of the outer sleeve portion to facilitate sliding of same back on itself when turned inside out and to facilitate movement of same over the rod end portions. The grease is not applied to the pulling fingers. When the outer sleeve portion is turned inside out externally of the rod end portions, it is placed in a circumferentially stretched relationship thereover. Finally, tape is tightly wrapped around the outer sleeve portion to provide a smooth finished assembly. The cable is now protected by the boot against damage from the rod end portions and the rod end portions are also tightly held against the exterior surface of the cable so they cannot snag on cable handling gear.

It is a principal object of the present invention to provide an improved boot forming member for externally and internally covering end portions of rods surrounding a cable.

It is an additional object of the invention to provide an improved method for applying a boot forming member in protective relationship internally and externally of rod end portions surrounding a cable.

Another object of the invention is the provision of an improved assembly wherein end portions of helical rods surrounding a cable have a protective boot covering same externally and internally.

A further object of the invention is the provision of an improved boot forming member which is very simple to manufacture and is also very easy to apply while providing optimum protection.

Still further objects and advantages for the invention will become apparent to those skilled in the art upon a reading and understanding of the following specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF A PREFERRED EMBODIMENT

Figure 1:
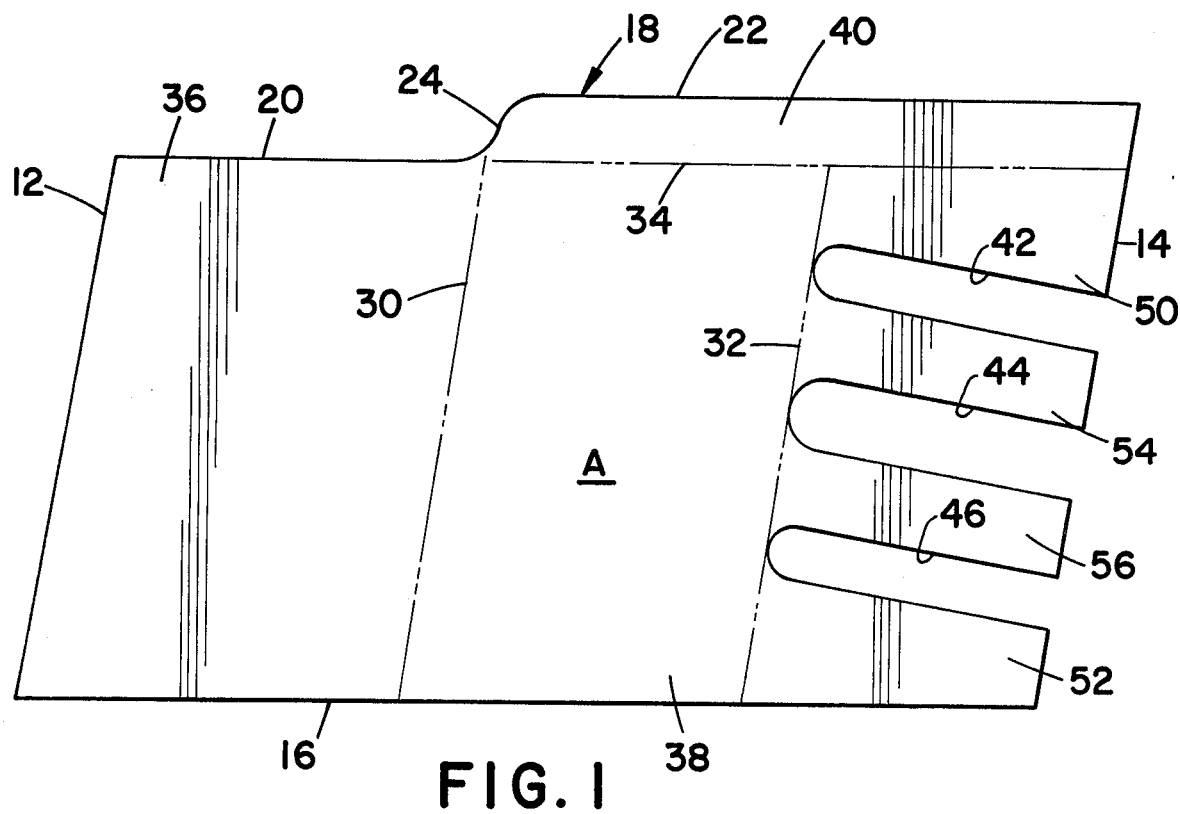
FIG. 1 is a plan view of a boot forming member constructed in accordance with the present application.

With reference to the drawings, wherein the showings are for purposes of illustrating a preferred embodiment of the invention only and not for purposes of limiting same, FIG. 1 shows a boot forming member in the form of a substantially flat sheet A of highly flexible elastomeric material. In a preferred form, sheet A is made of black neoprene of approximately 40 durometer hardness. However, it will be appreciated that sheet A can also be made of other materials including, but not necessarily limited to, natural rubber and synthetic plastic elastomers.

As shown in FIG. 1, sheet A has a generally rhomboidal peripheral shape and includes opposite parallel end edges 12,14 and opposite substantially parallel side edges 16,18. Side edge 18 includes parallel inner and outer side edges 20,22 offset from one another by a smoothly curved shoulder 24. Thus, end edge 14 has a length which is greater than the length of end edge 12.

Phantom lines which function as reference lines have been included on sheet A in FIG. 1 and are indicated by numerals 30,32 and 34. These phantom lines simply provide reference for use in describing various areas or portions of sheet A. The area of sheet A between end edge 12 and reference line 30 is generally indicated by numeral 36 and defines an inner sleeve forming portion. The area of sheet A between reference lines 30,32 is generally indicated by numeral 38 and defines an outer sleeve forming portion. That portion of sheet A between reference line 32 and end edge 14 provides gripping means for gripping the sheet after it has been wrapped around a cable as will be described in detail hereinbelow. The area of sheet A between outer side edge 22 and reference line 34 is generally indicated by numeral 40 and defines a flap which is used for bonding to an opposed outer surface of sheet A when it is wrapped around a cable. Flap 40 extends along the full length of outer sleeve forming portion 38 and gripping portion 50.

A plurality of spaced apart slits 42,44 and 46 extend along sheet A from end edge 14 to as far as reference line 32. Slots 42,44 and 46 are generally perpendicular to edge 14 and are preferably in the form of substantially U-shaped slots having smoothly curved peripheral edges so there are no sharp corners or the like which may cause stress concentrations and result in tearing of the sheet. A plurality of spaced apart flexible strips or fingers are formed by slots 42,44 and 46, including opposite end fingers 50,52 and intermediate fingers 54,56. At least one end finger 50 has a width substantially greater than the width of the other fingers. Middle slot 44 also has a width substantially greater than the width of end slots 42,46 so that the spacing between intermediate fingers 54,56 is substantially greater than the spacing between fingers 50,54 and 52,56.

The rhomboidal shape of sheet A is such that the opposite corners formed by the intersections of edges 12,16 and 14,22 have an included angle of approximately 80°, while the included angle formed by the intersections of edges 12,20 and 14,16 is approximately 100°. Obviously, these angles can vary substantially depending upon the use of the boot forming member. It will be recognized that the thickness and dimensions for sheet A may vary considerably depending upon various factors such as the environment in which the boot forming member will be used along with the type and diameter of the cable.

For purposes of explanation and proportion, various dimensions will hereinafter be given for the construction of one boot forming member which has been used. However, it will be recognized that these dimensions should in no way be taken as a limitation to practicing the subject new inventive concept. In that regard, sheet A has been constructed with a nominal thickness of approximately 0.062 inch. The length of side edge 16 is approximately 16.38 inches, while the length of end edge 12 is approximately 8.63 inches. The distance from end edge 12 to shoulder 24 as measured perpendicular to end edge 12 is approximately 6.00 inches. The length of slots 42,44 and 46 as measured from end edge 14 to reference line 32 is approximately 4.75 inches. The total length of sheet A, as measured along a line parallel to side edge 16, between the corners defined by the intersections of edges 12,16 and 14,22, is approximately 18 inches. The width of sheet A across side edges 16,20 and perpendicular thereto is approximately 8.50 inches. The width of sheet A across side edges 16,22 and perpendicular thereto is approximately 9.50 inches. Slots 42,46 have a width of approximately 0.80 inch, while center slot 44 has a width of approximately 1.10 inches. The width of each finger 52,54 and 56 as measured along end edge 14 is approximately 1.25 inches. Thus, sheet A has a length as measured parallel to its side edges which is substantially greater than its width. Likewise, the length of sheet A from reference line 30 to end edge 14 is substantially greater than the length of the sheet from end edge 12 to reference line 30.

Figure 2:
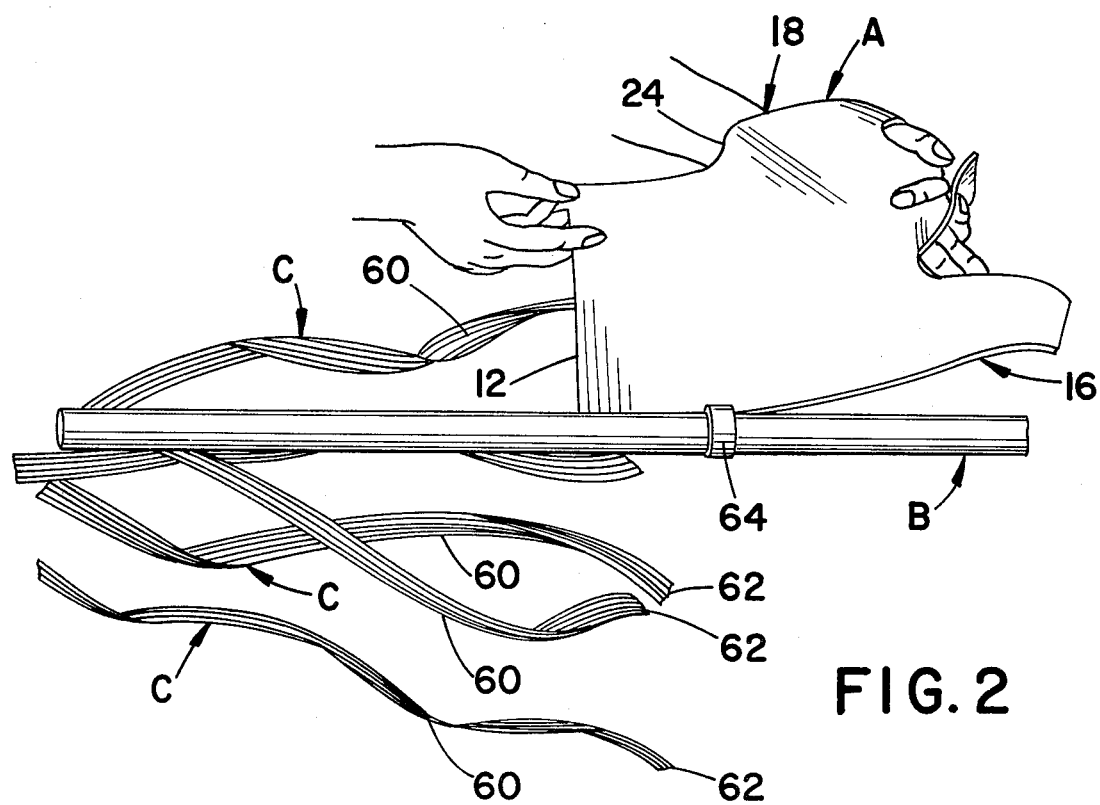
FIG. 2 is an elevational view showing the boot forming member of FIG. 1 being positioned for installation around a cable beneath rod end portions.

FIG. 2 shows a highly flexible cable B for transmitting electrical signals or the like and being covered by an outer sheath of dielectric material. When a cable B is spliced, it is common to apply a plurality of helically coiled metal splice rods C to the cable spanning the splice. Rods C not only protect the splice itself, but also closely grip cable B on opposite sides of the splice for transferring pulling forces over substantial lengths of the cable on opposite sides of the splice point. By way of example, splice rods C and the manner of applying same to a cable are disclosed in U.S. Pat. No. 3,032,964, issued May 8, 1962 to Peterson, the disclosure of which is incorporated hereinto by reference.

Each rod C commonly includes a plurality of individual rods defining a subset and the rods are individually applied to cable B by wrapping same therearound. Rods C are relatively rigid while being sufficiently flexible for allowing coiling of cable B around a drum and passage of same around sheaves or the like. Each helically coiled rod C includes an end portion 60 having a terminal end 62 which will be positioned at an approximate location indicated at 64 in FIG. 2 when end portions 60 are fully applied against cable B. Application of rods C to cable B may result in terminal ends 62 of each rod being longitudinally spaced a slight distance from adjacent rod ends. However, numeral 64 represents a piece of tape or chalk mark indicating the mean location for terminal ends 62 of rod end portions 60 when they are closely wrapped around the cable. If necessary, end portions 60 of rods C are uncoiled from cable B and moved generally radially outwardly therefrom to provide space for wrapping sheet A around cable B.

When installing the subject new protective boot on cable B, shoulder 24 on sheet A is approximately aligned with mark 64 on the cable and is positioned with end edge 12 extending substantially perpendicular to the cable longitudinal axis. Sheet A is then wrapped around cable B in the desired direction which, in the preferred embodiment, comprises the direction which would uncoil rods C. The sheet is wrapped in such a manner that end edge 12 at all times remains substantially perpendicular to the longitudinal axis of the cable. This means that sheet A is progressively wrapped on cable B from end edge 12 toward end edge 14. Opposite side edges 16 and 18 are applied to cable B in a generally helical manner with edge 16 being located closest to cable B. This arrangement is provided by the generally rhomboidal shape of sheet A so that total enclosure of cable B by sheet A takes place progressively. It is much easier to apply sheet A to the cable with this arrangement than with one in which side edges 16,18 extend substantially parallel to the longitudinal axis of the cable.

Depending upon the coiling direction of rods C, sheet A is positioned either below cable B in the manner shown in FIG. 2 for wrapping it counterclockwise around the cable as viewed from the right of the FIGURE, or is positioned above the cable for wrapping it in the opposite, clockwise direction. As previously noted, it is desirable to wrap sheet A around cable B in a coiling direction which would tend to uncoil end portions 60 of rods C from the cable. Although sheet A is shown being applied to only one end of rods C, it will be recognized that a corresponding boot forming member is applied to the opposite end portion of such rods. However, it will also be recognized that sheet A can be applied to end terminations or the like wherein only one end portion of coiled rods are protected.

Figure 3:
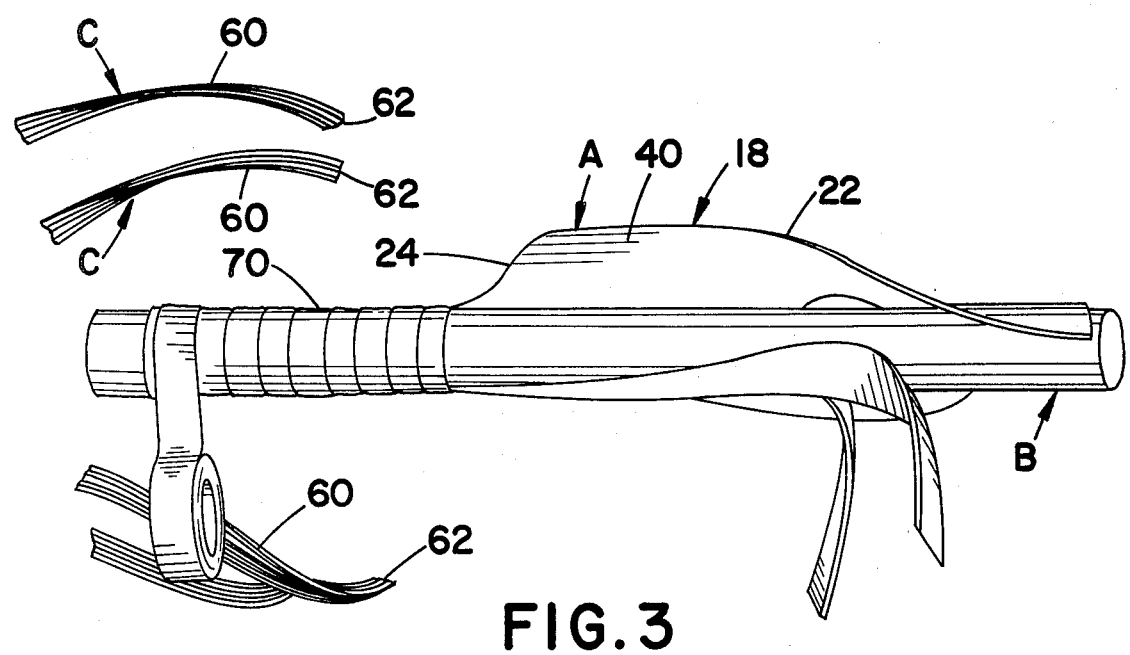
FIG. 3 is an elevational view showing the boot forming member after it has been wrapped around the cable and after tape has been applied to an inner sleeve forming portion of same.
Figure 4:
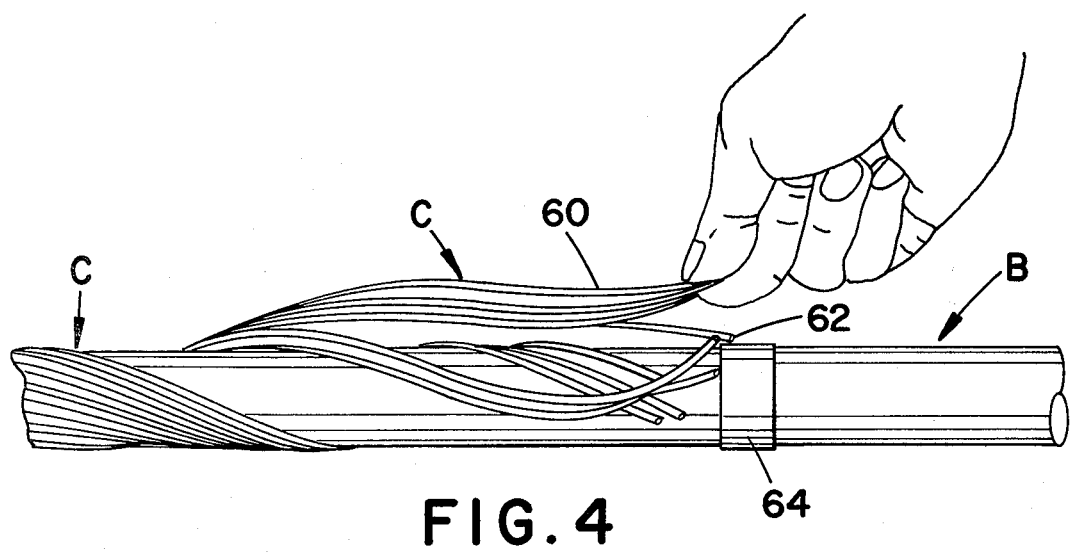
FIG. 4 is an elevational view showing the helical rods moved inwardly into snug surrounding relationship to the inner sleeve portion of the boot forming member.

Subsequent to tightly wrapping of sheet A around cable B, inner and outer sleeve forming portions 36,38 are transformed into inner and outer sleeves which surround cable B. The inner sleeve defined by inner sleeve forming portion 36 is located around cable B beneath rod end portions 60, while the outer sleeve portion formed by outer sleeve forming portion 38 extends axially outward beyond rod terminal ends 62 and mark 64 in FIG. 2. Once the wrapping of sheet A around cable B has taken place, the inner sleeve portion of sheet A is tightly wrapped with tape as generally indicated at 70 in FIG. 3. Tape 70 may be of any suitable type and is preferably an elastomeric tape which will tightly enclose and adhere to sheet A. Once the inner sleeve portion of sheet A is tightly taped, end portions 60 of rods C are manually moved inwardly in a close embracing relationship to the inner sleeve portion as shown in FIG. 4.

Figure 5:
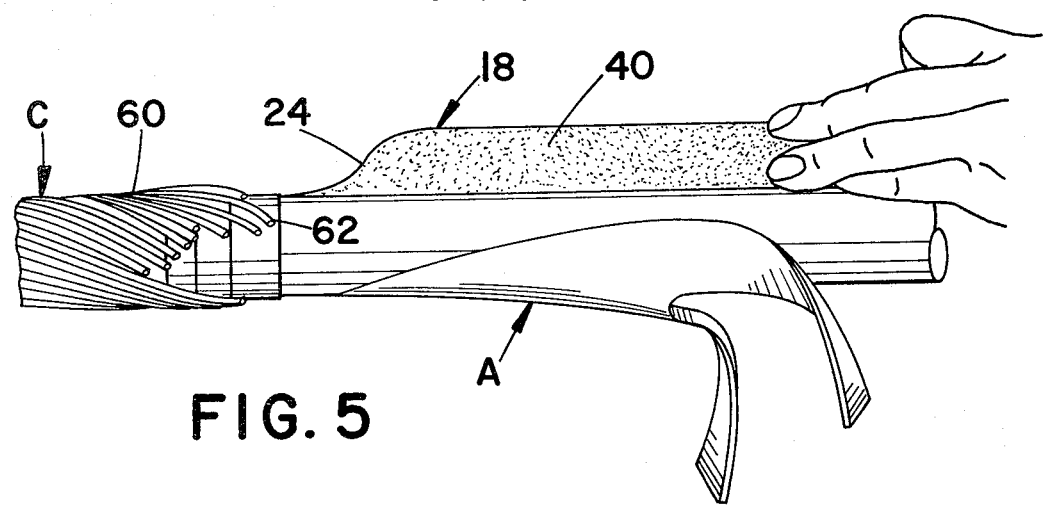
FIG. 5 is an elevational view showing a flap on the outer sleeve forming portion of the boot forming member for receiving adhesive.

Subsequent to positioning of rod end portions 60 in close surrounding relationship to the inner sleeve portion and the tape surrounding same, shoulder 24 on sheet A is spaced a slight distance axially beyond rod terminal ends 62 as shown in FIG. 5. Flap 40 is then suitably sanded or otherwise scarified and a suitable adhesive compatible with the material of sheet A is applied thereto. In addition, it will be recognized that heat bonding or solvent bonding is also possible. After suitable preparation and application of the adhesive, flap 40 is bonded to an opposed external surface of outer sleeve forming portion 38. This prevents outer sleeve forming portion 38 from radial or circumferential separation when it is turned inside out and pulled over rod end portions 60. Flap 40 is preferably bonded with the outer sleeve forming portion being slightly slack around the cable. That is, sheet A is not pulled tightly and stretched when flap 40 is bonded in position. This allows some slack for expansion of the outer sleeve forming portion when it is pulled over rod end portions 60.

Figure 6:
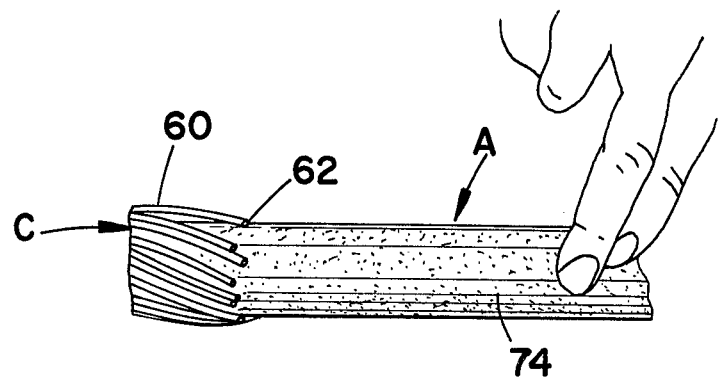
FIG. 6 is an elevational view showing the outer sleeve forming portion of the boot forming member after the flap portion thereof has been adhesively secured in position.

FIG. 6 shows sheet A after it has been formed into a cylinder around the cable and after flap 40 of FIG. 5 has been bonded to an external opposed surface of the outer sleeve forming portion 38. FIG. 6 also shows a layer of grease 74 applied to the external surface of the outer sleeve portion of sheet A to facilitate movement of same past itself and over rod end portions 60 when the outer sleeve portion is turned inside out. Grease 74 is not applied to any surfaces of fingers 50,52,54 and 56 (FIG. 1).

Figure 7:
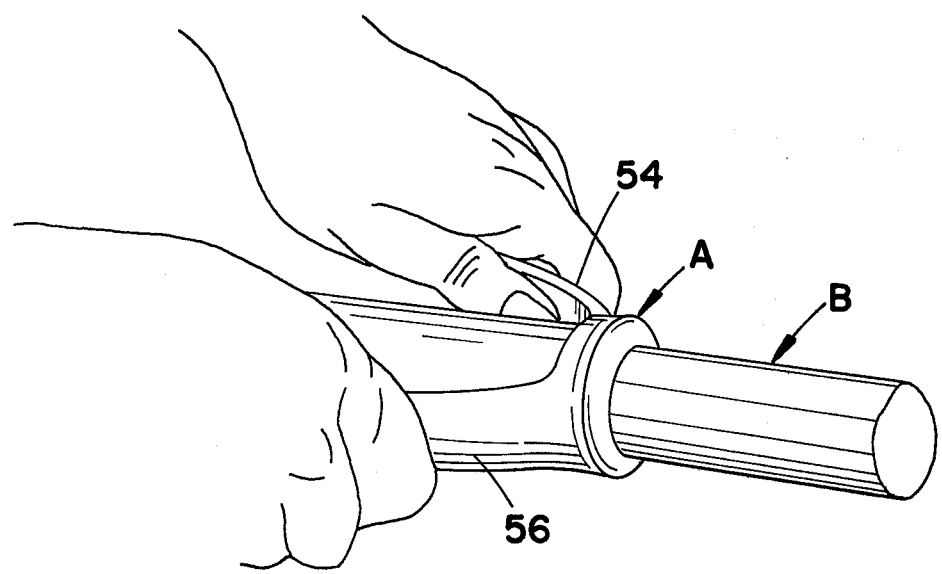
FIG. 7 is a plan view showing gripping means on the outer end portion of the boot forming member being pulled for turning same inside out and pulling same over the exterior of the end portions of the helical rods.
Figure 8:
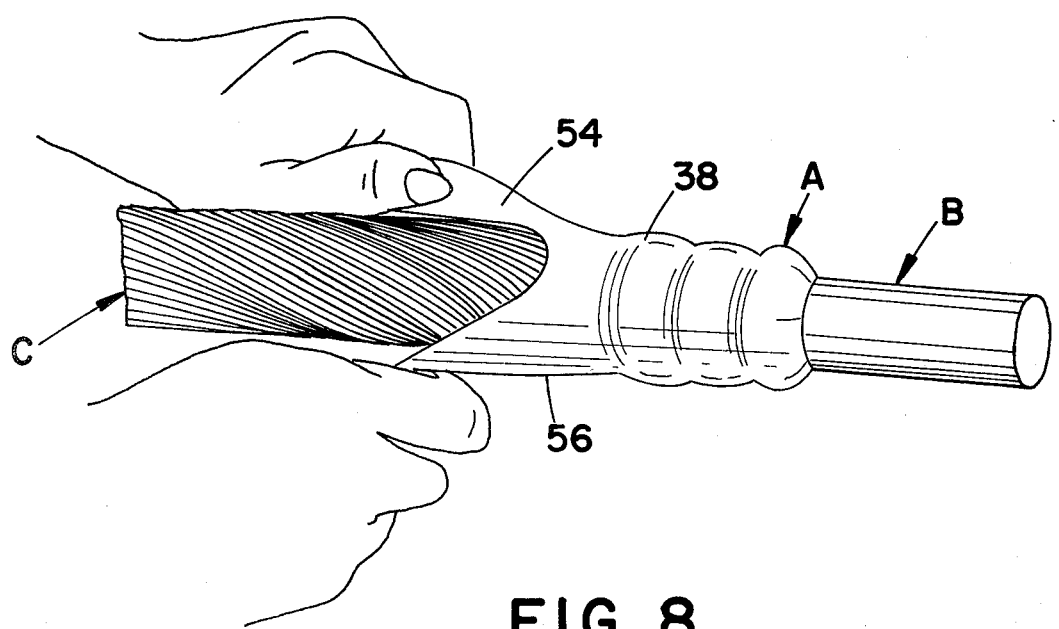
FIG. 8 is a plan view showing further progress in turning the outer sleeve forming portion of the boot forming member inside out over the external surface of the rod end portions by pulling on the gripping means; and, FIG. 9 is a plan view of the completed joint after tape has been wrapped around the outer sleeve forming portion of the boot forming member and around the gripping means integral therewith.

The next step is to manually grasp any of pulling fingers 50,52,54 or 56 as shown in FIG. 7 in order to turn the outer sleeve portion inside out by pulling same back over onto itself while also pulling same back over the inner sleeve portion and rod end portions 60. In FIG. 8, the boot forming member defined by sheet A has its outer sleeve portion 38 pulled substantially the full length over rod end portions 60.

Figure 9:
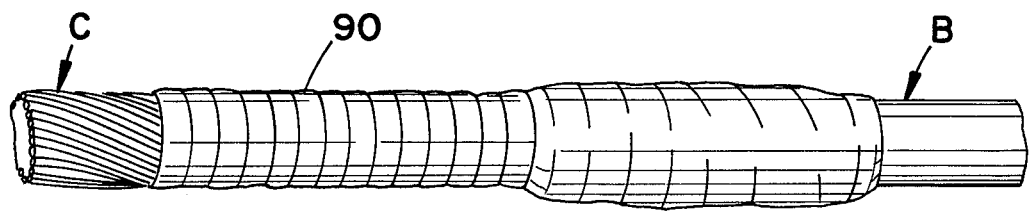

Finally, the outer sleeve portion is tightly wrapped with tape as generally shown at 90 in FIG. 9 in order to maintain the outer sleeve portion in close proximity to rod end portions 60. In FIG. 9, tape 90 is shown extending over a sufficient axial length of rods C to cover fingers 50,52,54 and 56. However, it will be recognized that it is possible, if so desired, to simply cut the fingers off from sheet A after they have served their purpose. The important feature is that of covering the outer sleeve portion 38 of FIG. 8 with tape 90 as shown in FIG. 9 to maintain it in close engagement with rod end portions 60.

When the outer sleeve portion of sheet A is pulled inside out externally over rods C as generally shown in FIGS. 7 and 8, the outer sleeve portion is radially or circumferentially stressed so that rods C are held in close engagement with the external surface of inner sleeve portion 36. The tape applied to the external surface of outer sleeve portion 38 also maintains the rod end portions in close proximity to cable B. This arrangement prevents terminal end portions 60 or terminal ends 62 of rods C from fouling in cable handling gear or the like. In addition, this arrangement prevents rod terminal ends 62 from chafing or otherwise damaging the external sheath of cable B. The assembly shown in FIG. 9 provides optimum protection of cable B against damage while also providing optimum protection against snagging of the terminal end portions of helical rods C in cable handling gear.

As previously detailed, fingers 50,52,54 and 56 provide gripping means for manually grasping sheet outer sleeve portion 38 to facilitate turning the outer sleeve portion inside out. If desired, this manual gripping means may take other forms such as, for example, holes in the sheet for receiving a person's fingers or pulling tabs attached to the sheet. Such other forms do not, however, in any way depart from the overall intent or scope of the present invention.

Although the invention of the present application has been described with reference to a preferred embodiment, it is obvious that equivalent alterations and modifications will occur to others skilled in the art upon a reading and understanding of this specification. It is intended to include all such alterations and modifications insofar as they come within the scope of the appended claims or the equivalents thereof.

Having thus described the invention, it is now claimed:

1. A boot forming member for externally and internally covering end portions of rods surrounding a cable comprising:
   a substantially flat sheet of highly flexible elastomeric material having inner and outer sleeve forming portions therealong, said sheet being wrappable around a cable to form said inner and outer sleeve forming portions into inner and outer sleeves with said inner sleeve positioned beneath end portions of rods surrounding the cable and with said outer sleeve extending axially of the cable beyond the rod end portions, and said outer sleeve forming portion having plural spaced-apart gripping means along the one end portion thereof opposite from said inner sleeve forming portion for providing manual gripping of said outer sleeve at a plurality of circumferentially spaced locations to pull same inside out back into said inner sleeve in overlying relationship to the rod end portions.

2. The boot forming member as defined in claim 1 wherein said outer sleeve forming portion has a width which is greater than the width of said inner sleeve forming portion and one end of said sheet along said outer sleeve forming portion is substantially longer than the opposite end of said sheet along said inner sleeve forming portion.

3. The boot forming member as defined in claim 1 wherein said gripping means comprises a plurality of elongated flexible strips of said sheet.

4. The boot forming member as defined in claim 1 wherein said sheet has a substantially rhomboidal peripheral shape.

5. The boot forming member as defined in claim 1 wherein said sheet has a generally rhomboidal peripheral shape including opposite ends and opposite sides, a plurality of spaced apart slits extending inwardly from said one end portion substantially perpendicular to one of said ends and forming a plurality of flexible fingers defining said gripping means.

6. The boot forming member as defined in claim 5 wherein said slits are in the form of generally U-shaped slots having a width less than the width of said fingers.

7. A boot forming member for externally and internally covering end portions of rods surrounding a cable comprising:
   a substantially flat sheet of highly flexible material having a generally rhomboidal peripheral shape including opposite ends and opposite sides and having inner and outer sleeve forming portions therealong, said sheet being wrappable around a cable to form said inner and outer sleeve forming portions into inner and outer sleeves with said inner sleeve positioned beneath end portions of rods surrounding the cable and with said outer sleeve extending axially of the cable beyond the rod end portions, said outer sleeve forming portion having a plurality of spaced-apart generally U-shaped slots extending substantially perpendicular to one of said ends inwardly from the one end portion thereof opposite from said inner sleeve forming portion to define a plurality of flexible fingers for providing manual gripping of said outer sleeve to pull same inside out back onto said inner sleeve in overlying relationship to the rod end portions, said generally U-shaped slots having a width less than the width of said fingers, said fingers including terminal fingers adjacent said opposite sides and intermediate fingers spaced intermediate said terminal fingers, and at least one of said terminal fingers having a width substantially greater than said intermediate fingers.

8. A boot forming member for use in externally and internally covering end portions of rods covering a cable or the like comprising:
   a flat sheet of elastomeric material having opposite ends and opposite sides, said sheet adjacent one of said ends having an outer boot forming portion with a width as measured across said sides which is substantially greater than the width of an inner boot forming portion adjacent the other of said ends, one end of said sheet along said outer boot forming portion being substantially longer than the opposite end of said sheet along said inner boot forming portion, and said sheet having a plurality of spaced apart slits extending from said one end toward said other end over a portion of the width of said outer boot forming portion to define a plurality of fingers.

9. The boot forming member as defined in claim 8 wherein said outer boot forming portion has a length as measured across said ends which is substantially greater than one half the distance between said ends.

10. The boot forming member as defined in claim 8 wherein said slits are defined by generally U-shaped slots.

11. The boot forming member as defined in claim 10 wherein said generally U-shaped slots have a width less than the width of said fingers.

12. In an assembly including a cable having a plurality of rods surrounding same and including rod end portions, a protective boot internally and externally covering at least one of said rod end portions, said boot being defined by a flat sheet of elastomeric material having an inner sleeve forming portion wrapped around said cable beneath said one rod portion and having an integral outer sleeve forming portion pulled over said one rod end portion.

13. The assembly as defined in claim 12 wherein said sheet has opposite side portions extending generally longitudinally of said cable, and said side portions along said outer sleeve forming portion being bonded together.

14. The assembly as defined in claim 12 wherein said outer sleeve forming portion has a length substantially greater than said inner sleeve forming portion, said outer sleeve forming portion having a plurality of spaced apart slits therein extending not greater than approximately one-half the length of said outer sleeve forming portion.

15. The assembly as defined in claim 12 wherein said sheet has a width which is at least approximately two times the circumference of said cable.

16. The assembly as defined in claim 12 wherein said rods comprise helical coiled rods wrapped around said cable in a coiling direction, and said sheet being wrapped around said cable in a direction which would uncoil said rods.

17. A method of positioning a boot over end portions of rods surrounding a cable comprising the steps of:
spacing said rod end portions outwardly of said cable;
providing a flat sheet of elastomeric material having inner and outer sleeve forming portions;
wrapping said inner sleeve forming portion around said cable beneath said rod end portions while wrapping said outer sleeve forming portion around said cable axially beyond said rod end portions;
moving said rod end portions inwardly in close surrounding relationship to said inner sleeve forming portion; and,
pulling said outer sleeve forming portion inside out over said rod end portions.

18. The method as defined in claim 17 wherein said sheet of elastomeric material has opposite side portions and including the step of bonding together said side portions along the length of said outer sleeve forming portion prior to said step of pulling said outer sleeve forming portion inside out over said rod end portions.

19. The method as defined in claim 17 wherein said sheet is wrapped around said cable at least two times.

20. The method as defined in claim 17 including the step of tightly wrapping tape around said inner sleeve forming portion prior to said step of moving said rod end portions inwardly and tightly wrapping tape around said outer sleeve forming portion subsequent to pulling same inside out.

21. A boot forming member for use in externally and internally covering end portions of rods covering a cable or the like comprising:
a flat sheet of elastomeric material having opposite ends and opposite sides, said sheet adjacent one of said ends having an outer boot forming portion with a width as measured across said sides which is substantially greater than the width of an inner boot forming portion adjacent the other of said ends, said outer boot forming portion having a length as measured across said ends which is substantially greater than one half the distance between said ends, and said sheet being of generally rhomboidal shape and having a plurality of spaced apart slits extending from said one end substantially perpendicular thereto toward said other end to define a plurality of fingers.

* * * * *